(12) United States Patent
Mikami et al.

(10) Patent No.: US 8,530,025 B2
(45) Date of Patent: Sep. 10, 2013

(54) OPTICAL INFORMATION RECORDING MEDIUM

(71) Applicant: FUJIFILM Corporation, Tokyo (JP)

(72) Inventors: Tatsuo Mikami, Odawara (JP); Hidehiro Mochizuki, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/790,907

(22) Filed: Mar. 8, 2013

(65) Prior Publication Data

US 2013/0189494 A1  Jul. 25, 2013

Related U.S. Application Data

(63) Continuation of application No. PCT/JP2011/069686, filed on Aug. 31, 2011.

(30) Foreign Application Priority Data

Sep. 17, 2010 (JP) .................................. 2010-209489

(51) Int. Cl.
*G11B 7/24* (2013.01)

(52) U.S. Cl.
USPC .................... 428/64.1; 428/64.4; 430/270.11; 369/275.1; 369/275.4

(58) Field of Classification Search
USPC ........................... 428/64.4; 369/275.1, 275.4
See application file for complete search history.

(56) References Cited

U.S. PATENT DOCUMENTS

| 5,408,453 A | 4/1995 | Holtslag et al. |
| 6,487,164 B1* | 11/2002 | Endoh et al. ................ 369/275.4 |
| 2006/0098561 A1* | 5/2006 | Iwasa et al. ................ 369/275.1 |
| 2008/0130458 A1 | 6/2008 | Shiono et al. |
| 2009/0129252 A1* | 5/2009 | Endoh et al. ................ 369/275.4 |

FOREIGN PATENT DOCUMENTS

| JP | 62-157344 A | 7/1987 |
| JP | 04-349239 A | 12/1992 |
| JP | 2963516 B2 | 10/1999 |
| JP | 2002-063738 A | 2/2002 |
| JP | 2008-293659 A | 12/2008 |
| WO | 2006/051765 A1 | 5/2006 |

OTHER PUBLICATIONS

Int'l Search Report of PCT/JP11/069686, dated Dec. 6, 2011, 3 pages in Japanese and English.

* cited by examiner

*Primary Examiner* — Elizabeth Mulvaney
(74) *Attorney, Agent, or Firm* — Sughrue Mion, PLLC

(57) ABSTRACT

An optical information recording medium comprises a plurality of recording layers, and intermediate layers provided between the plurality of recording layers. The optical information recording medium has a recess for use in tracking, in a layer which is provided in a position farther, than the plurality of recording layers, from a light-incident side on which a beam emitted for recording/reading enters. A depth D of the recess is λ/4n where λ is a wavelength of the beam emitted for recording/reading, n is a refractive index of a layer with which the recess is filled.

3 Claims, 4 Drawing Sheets

OPTICAL INFORMATION RECORDING MEDIUM

CROSS-REFERENCE TO RELATED APPLICATION(S)

This application is a continuation of the international application No. PCT/JP2011/069686 filed on Aug. 31, 2011 which claims the priority benefit of Japanese Patent Application No. 2010-209489 filed on Sep. 17, 2010 in the Japan Patent Office, the disclosures of which are herein incorporated by reference in their entirety.

BACKGROUND

1. Field

The present invention relates to an optical information recording medium including a plurality of recording layers and at least one intermediate layer provided between the plurality of recording layers.

2. Description of Related Art

In recent years, research has been carried out on an optical information recording medium including a plurality of recording layers and at least one intermediate layer provided between the plurality of recording layers, in order to record information in multiple layers. JP 2008-293659 A (a related US patent issued under U.S. Pat. No. 5,408,453 A) discloses such an optical information recording medium, in which a guide surface having a guide track (recess for use in tracking) is formed on a substrate, and a spacer layer (intermediate layer) and a recording layer are provided over the guide surface. This document also discloses a method of tracking and recording/reading using different beams (i.e., a guide beam and a scanning beam).

SUMMARY

When tracking and recording/reading using different beams are performed at an optical information recording medium as described in JP 2008-293659 A, a beam emitted for recording/reading partially passes through the recording layer, and is possibly reflected at the guide surface. The beam emitted for recording/reading and reflected at the guide surface would possibly interfere with a beam emitted for recording/reading and reflected at a recording layer on which the beam is focused for reading, a beam emitted for tracking and reflected at the guide surface, or other beams. For example, interference of the beam emitted for recording/reading and reflected at the guide surface with a beam emitted for recording/reading and reflected at a recording layer on which the beam is focused for reading would possibly produce a noise in a readout signal.

With this in view as a backdrop, the present invention has been made. In one or more embodiments of the present invention, an optical information recording medium is provided with which reflection of a beam emitted for recording/reading at a layer having a recess provided for use in tracking can be reduced.

In more specific aspect, an optical information recording medium is proposed which comprises a plurality of recording layers, at least one intermediate layer provided between the plurality of recording layers, and a layer having a recess for use in tracking, which layer is provided in a position farther, than the plurality of recording layers, from a light-incident side on which a beam emitted for recording/reading enters, wherein a depth of the recess is $\lambda/4n$ where $\lambda$ is a wavelength of the beam emitted for recording/reading, n is a refractive index of a layer with which the recess is filled.

With this optical information recording medium configured such that the depth of the recess is $\lambda/4n$ where $\lambda$ is a wavelength of the beam emitted for recording/reading, n is a refractive index of a layer with which the recess is filled, the beam emitted for recording/reading is reflected at a bottom of the recess and propagates with a phase $\lambda/2$ shifted from that of a beam emitted for recording/reading and reflected at a surface (front not recessed) of the layer having the recess. As a result, the beam emitted for recording/reading and reflected at the bottom of the recess and the beam emitted for recording/reading and reflected at the not-recessed front surface of the layer having the recess cancel each other out, with the result that reflection of the beam for recording/reading at the layer having the recess can be reduced.

The beam (emitted) for recording/reading as used herein refers to at least one of a recording beam emitted for recording information in the optical information recording medium and a reading beam emitted for retrieving (reading out) information recorded in the optical information recording medium.

The aforementioned optical information recording medium may further comprise a reflective layer provided to cover a surface having unevenness formed by the recess and configured to reflect a beam emitted for tracking.

With this feature, the beam emitted for tracking can be reflected properly. In this configuration, a wavelength of the beam emitted for recording/reading and that of the beam emitted for tracking are different from each other.

The aforementioned optical information recording medium may further comprise an absorptive layer provided between the layer having the recess and a recording layer nearest to the layer having the recess, which absorptive layer has an absorptance for the beam emitted for recording/reading greater than that for a beam emitted for tracking.

With this feature, the beam emitted for recording/reading, passing through the recording layer nearest to the layer having the recess and traveling toward the layer having the recess, and the beam emitted for recording/reading and reflected at the layer having the recess can be absorbed and reduced, so that the beam emitted for recording/reading can be restrained from returning from the layer having the recess back to the light-incident side on which the beam emitted for recording/reading enters.

DESCRIPTION OF EMBODIMENTS

First Embodiment

Next, a first embodiment of the present invention will be described with reference made to the drawings.

Figure 1:
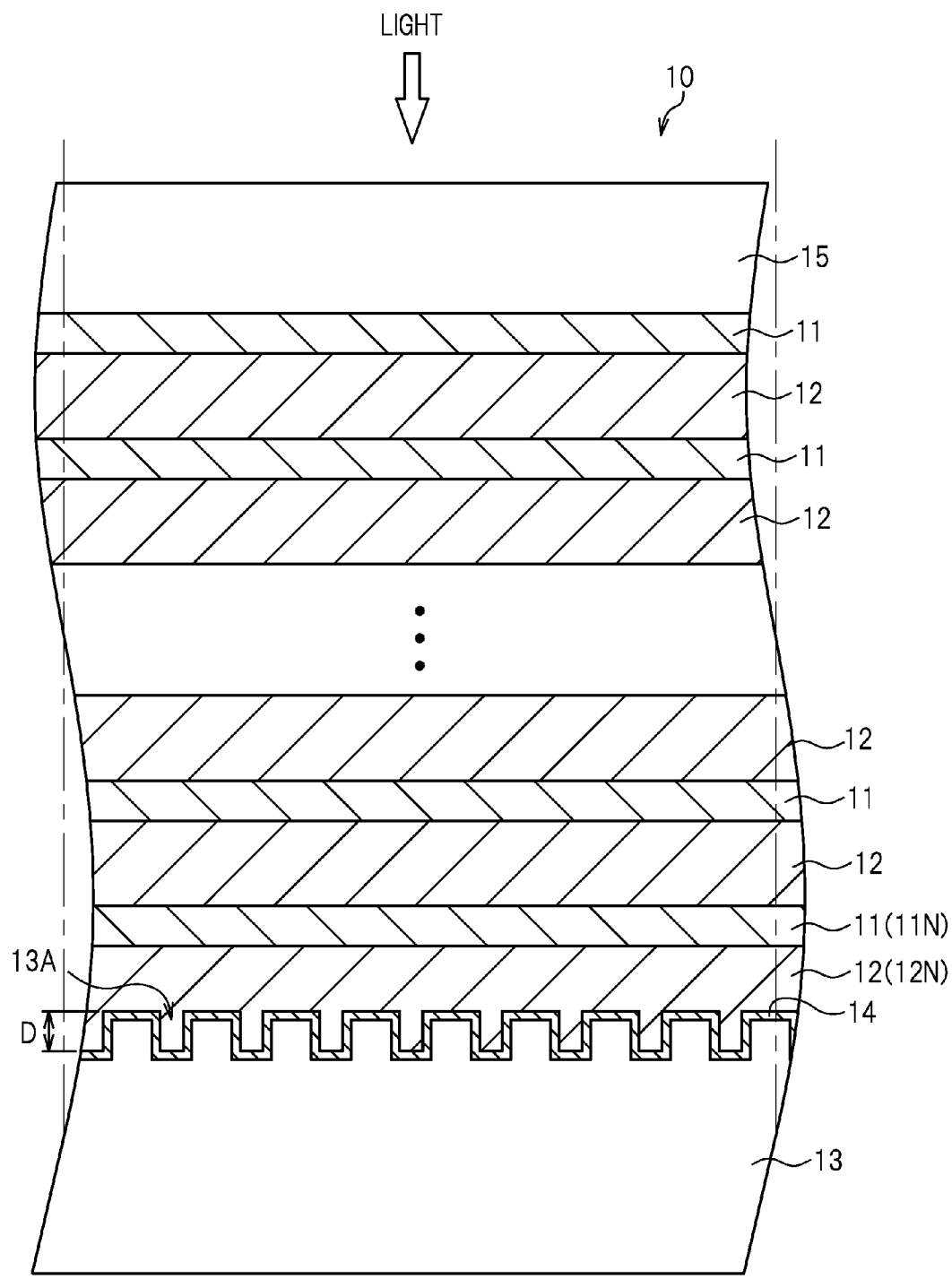
FIG. 1 is a diagram showing a structure of an optical information recording medium according a first embodiment.

As shown in FIG. 1, an optical information recording medium 10 mainly includes a plurality of recording layers 11, a plurality of intermediate layers 12, a substrate 13, a reflective layer 14 and a cover layer 15.

The recording layers 11 consist of layers each containing a photosensitive material in which information is optically recordable, and a plurality of such recording layers 11 are spaced out at predetermined intervals. The material for the recording layer 11 may be any material without limitation as long as it is suitable for the multilayer optical information recording medium 10. For example, the recording layers 11 may be of a material which changes its refractive index, light absorptance, fluorescence intensity, and a shape of an interface between the intermediate layer 12 and itself, by irradiation with the recording beam. To be more specific, for example, a material containing a dye in which a one-photon absorption or a multiphoton absorption takes place upon irradiation with the recording beam, and a binder (resin) in which the dye is dispersed and which changes its refractive index, shape or the like by heat generated by the dye absorbing the recording beam may be used.

The thickness of the recording layer 11 may be predetermined without limitation, but preferably be 5 micrometer or less in order to increase the number of the recording layers 11. The number of the recording layers 11 may be determined without limitation as long as two or more layers are provided, but the more the number of the layers, the better may be in order to increase the storage capacity of the optical information recording medium 10; for example, it is preferable that 10 or more layers are provided.

The intermediate layers 12 are provided between the plurality of recording layers 11 (between recording layer 11 and recording layer 11), and between the recording layer 11 (11N) provided in a position farthest, among the plurality of recording layers 11, from a light-incident side on which a beam emitted for recording/reading enters (upper side of FIG. 1) and the substrate 13 (reflective layer 14), respectively. This intermediate layer 12 is provided to keep enough space between the recording layers 11 so as not to induce interlayer crosstalk between the plurality of recording layers 11 (i.e., signal mixing between adjacent recording layers 11).

The material of the intermediate layer 12 may be any material which will not change by irradiation with the beam emitted from recording/reading without limitation as long as it is suitable for the multilayer optical information recording medium 10. The intermediate layer 12 may preferably be of a material which is transparent to the beam emitted for recording/reading and the beam emitted for tracking in order to minimize the loss of the beams. The term transparent is used to refer to the absorptance being not greater than 1 percent for the beams emitted for recording/reading or for tracking.

The thickness of the intermediate layer 12 may be predetermined without limitation, but the thickness of at least one of the intermediate layers 12 provided between the plurality of the recording layers 11 may preferably be 3 micrometer or more in order to avoid the interlayer crosstalk.

The substrate 13 is a support member for supporting the recording layers 11 and the intermediate layers 12, and is provided in a position farthest among the layers from a light-incident side on which a beam (of light) emitted for recording/reading enters. In the present embodiment, the substrate 13 is made of resin such as polycarbonate and shaped like a disc.

An incident-side surface of the substrate 13 on which a beam emitted for recording/reading enters (i.e., top surface in the drawing) has a recess 13A composed of grooves or pits (holes) provided for use in tracking. To illustrate further in detail, the recess 13A is in the form of a spiral as seen in the top view of the substrate 13. The substrate 13 having the recess 13A as described above in the present embodiment is an example of "a layer (a layer having a recess) provided in a position farther, than the plurality of recording layers, from a light-incident side on which a beam emitted for recording/reading enters". In the present embodiment, the recess 13A (grooves or pits) for use in tracking is formed only in the substrate 13, and not provided in the recording layers 11 or the like.

On the substrate 13, a reflective layer 14 is provided, to cover the uneven surface formed by the recess 13A, by known a method such as sputtering.

The depth D of the recess 13A of the substrate 13 on which the reflective layer 14 is provided is $\lambda/4n$ where $\lambda$ is a wavelength of the beam emitted for recording/reading, n is a refractive index of a layer with which the recess 13A is filled (to be more specific, the intermediate layer 12N adjacent to the substrate 13 or the reflective layer 14 thereon). To take an example, assuming that the wavelength of the beam emitted for recording/reading is 405 nm, and the refractive index of the intermediate layer 12N is 1.5, the depth D of the recess 13A is 67.5 nm.

The recess 13A may be formed by a known method, for example, by a method in which a stamper having an uneven surface shaped in a pattern reverse to the uneven surface to be formed on the substrate 13 is employed as a mold when a plastic plate to be used as the substrate 13 is molded so that the uneven shape is transferred, or otherwise formed in the substrate 13. The depth D of the recess 13A may be adjusted, for example, if the aforementioned stamper is made by etching or the like, by changing the time for etching in the process of making the stamper.

The thickness of the substrate 13 may be predetermined without limitation as long as the thickness is adapted to provide the substrate 13 with a strength sufficient to support the recording layers 11 and the intermediate layers 12 and to permit the recess 13A as described above to be formed therein, but may preferably be 100 micrometer or greater, for example.

The reflective layer 14 is a layer for reflecting a beam emitted for tracking, and is made of a thin film of aluminum evaporated on the uneven surface of the substrate 13. By providing this reflective layer 14, the beam emitted for tracking can be reflected properly.

The cover layer 15 is a layer for protecting the recording layers 11 and the intermediate layers 12, and is made of a material capable of transmitting a beam emitted for recording/reading and a beam emitted for tracking. This cover layer 15 to be provided has an appropriate thickness of several tens of micrometers to several millimeters.

With the optical information recording medium 10 as described above, the depth D of the recess 13A is $\lambda/4n$ where $\lambda$ is a wavelength of the beam emitted for recording/reading, n is a refractive index of the intermediate layer 12N; therefore, the beam emitted for recording/reading is reflected at a bottom (groove) of the recess 13A and propagates with a phase $\lambda/2$ shifted from that of a beam emitted for recording/reading and reflected at a not-recessed surface (land) of the substrate 13. As a result, the beam emitted for recording/reading and reflected at the groove and the beam emitted for recording/reading and reflected at the land cancel each other out, with the result that reflection of the beam for recording/reading at the substrate 13 can be reduced.

Figure 2:
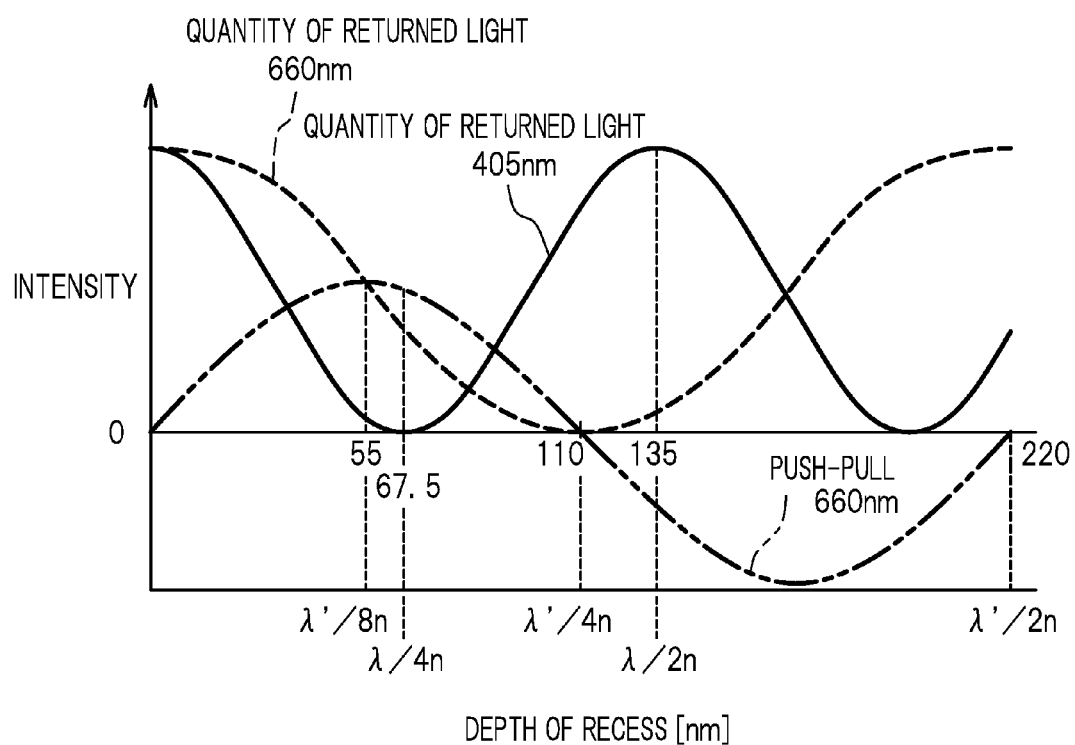
FIG. 2 is a graph showing a relationship between the depth of a recess and the quantity of returned light and push-pull signal.

For example, assuming that the wavelength $\lambda$ of the beam emitted for recording/reading is 405 nm, the wavelength $\lambda'$ of the beam emitted for tracking is 660 nm, and the refractive index n of the intermediate layer 12N is 1.5, the quantity of light emitted for recording/reading and returned will be made approximately equal to zero by setting the depth D of the recess 13A to λ/4n, i.e., 67.5 nm, as shown in FIG. 2; it has thus been shown that the reflection of the beam for recording/reading at the substrate 13 is reduced. It has also been shown that, on the same principle, the quantity of light emitted for tracking and returned (quantity of returned light=660 nm) will be made approximately zero by setting the depth D of the recess to λ'/4n (=110 nm).

In this way, the reflection of the beam emitted for recording/reading and returned from the substrate 13 is reduced by setting the depth D of the recess 13A to λ/4n; therefore, interference of the beam emitted for recording/reading and reflected at the substrate 13 with the beam emitted for recording/reading and reflected at a recording layer 11 from which information is to be read out and the beam emitted for tracking and reflected at the substrate 13 (reflective layer 14), and the like can be suppressed. Consequently, for example, a noise in the readout signal can be reduced, and the quality of the readout signal can be improved.

A push-pull signal for the beam emitted for tracking (push-pull 660 nm) shown in FIG. 2 is a signal representative of a difference between measures of light (beam emitted for tracking) diffracted at the recess 13A taken by two sensing elements of a two-segment photodetector, and the magnitude of its value (absolute value) indicates the easiness of the tracking control. Normally, it is desirable that the depth of the groove or pit for use in tracking is set such that the intensity (absolute value) of the push-pull signal is enhanced.

In FIG. 2, the intensity of the push-pull signal exhibits its maximum value when the depth of the recess is 55 nm (=λ'/8n); however, in the present embodiment, the depth D of the recess 13A is set at 67.5 nm (=λ/4n). When the depth D is 67.5 nm, the intensity of the push-pull signal is slightly smaller than the value exhibiting when the depth is 55 nm, but the push-pull signal can be obtained enough to execute the tracking control without problem.

Second Embodiment

Next, a second embodiment of the present invention will be described. In this embodiment, the same elements similar to those of the above-described first embodiment are designated by the same reference numerals, and a duplicate description thereof will be omitted.

Figure 3:
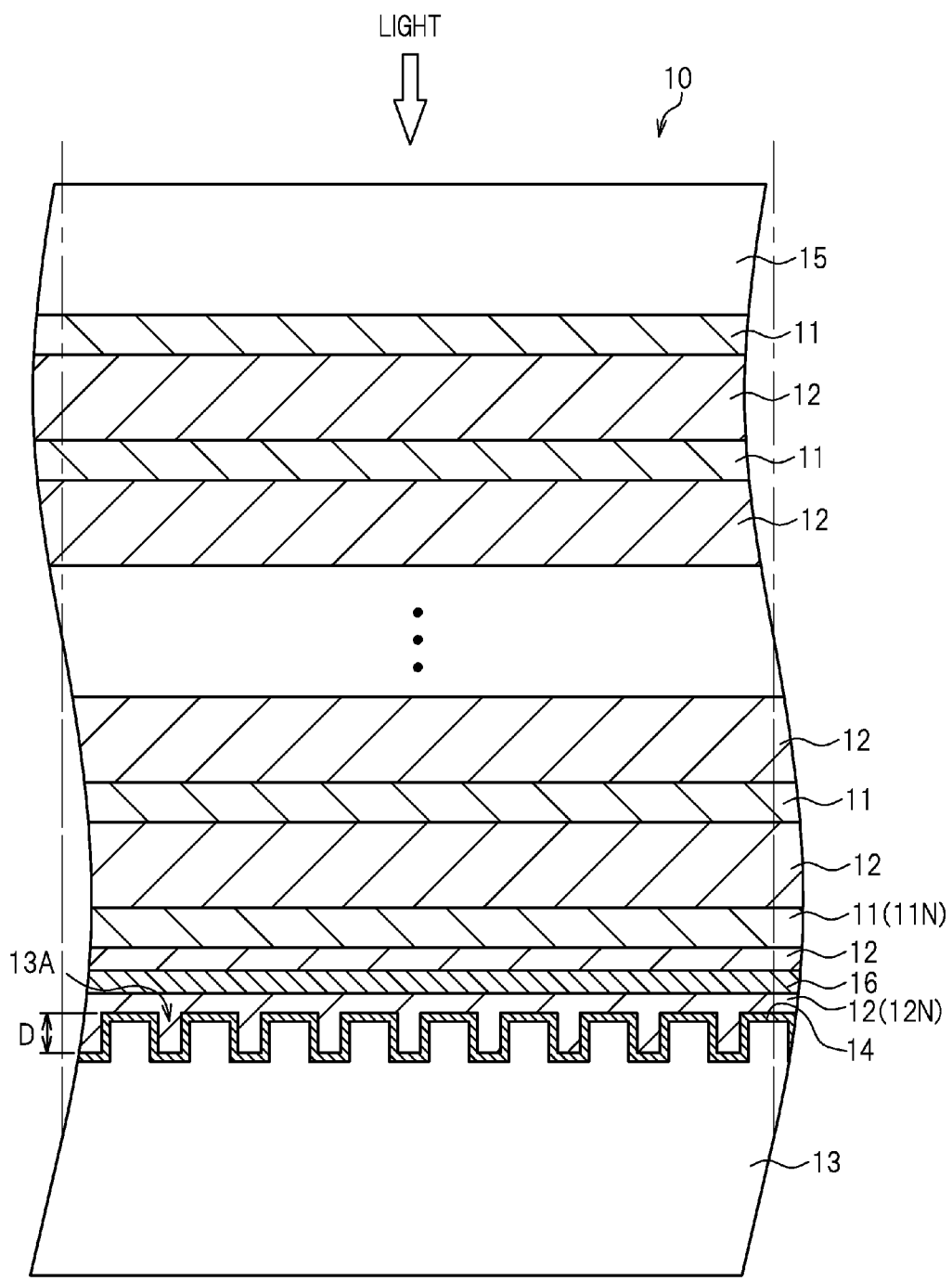
FIG. 3 is a diagram showing a structure of an optical information recording medium according to a second embodiment.

As shown in FIG. 3, the optical information recording medium 10 according to the present embodiment includes an absorptive layer 16 disposed between the substrate 13 (layer having the recess 13A) and a recording layer 11N nearest to the substrate 13.

The absorptive layer 16 is formed of a material whose absorptance for the beam emitted for recording/reading is greater than that for the beam emitted for tracking. Assuming, by way of example, that the wavelength of the beam emitted for recording/reading is 405 nm and the wavelength of the beam emitted for tracking is 660 nm, the absorptive layer 16 may be formed of a material containing a dye of which the absorptance for light having a wavelength of 405 nm is 0.5 or more and the absorptance for light having a wavelength of 660 nm is 0.1 or less. Examples of dye having an absorption peak on the order of 405 nm and having no absorption for light having a wavelength of 660 nm includes Kayaset Yellow 2G (manufactured by Nippon Kayaku Co., Ltd.) and VALIFAST Yellow 1101 (manufactured by Orient Chemical Industries Co., Ltd.), for example.

By providing such an absorptive layer 16, the beam emitted for recording/reading passing through the recording layer 11N and traveling toward the substrate 13 and the beam emitted for recording/reading and reflected at the substrate 13 can be reduced by absorption therein, and thus a beam emitted for recording/reading and returned toward an incident-side on which the beam emitted for recording/reading enters (i.e., toward the cover layer 15 side) can be reduced.

In the present embodiment, the absorptive layer 16 having a belt-like cross section is provided, but the present invention is not limited to this configuration; for example, the intermediate layer 12N of the layer structure shown in FIG. 1 may be replaced by an absorptive layer with which the recess 13A is filled. In this configuration, the refractive index n which defines the depth D (=λ/4n) of the recess 13A is the refractive index of the absorptive layer. Alternatively, an absorptive layer may have such an uneven shape as to fit the uneven shape of the reflective layer 14 (substrate 13).

Although the embodiment of the present invention has been described above, the present invention is not limited to the above-described embodiment. Changes may be made to its specific structure, where appropriate, within the scope not departing from the spirit of the present invention.

In the above-described embodiment, the reflective layer 14 is provided on the uneven surface (of the substrate 13) formed of the recess 13A, but the present invention is not limited to this configuration; for example, an alternative configuration without an reflective layer may be feasible if the layer having a recess is made of a material having a high reflectivity. The reflective layer may also be omitted if the difference between the refractive index of the layer having a recess and the refractive index of a layer adjacent to the uneven surface of the layer having a recess is increased.

Figure 4:
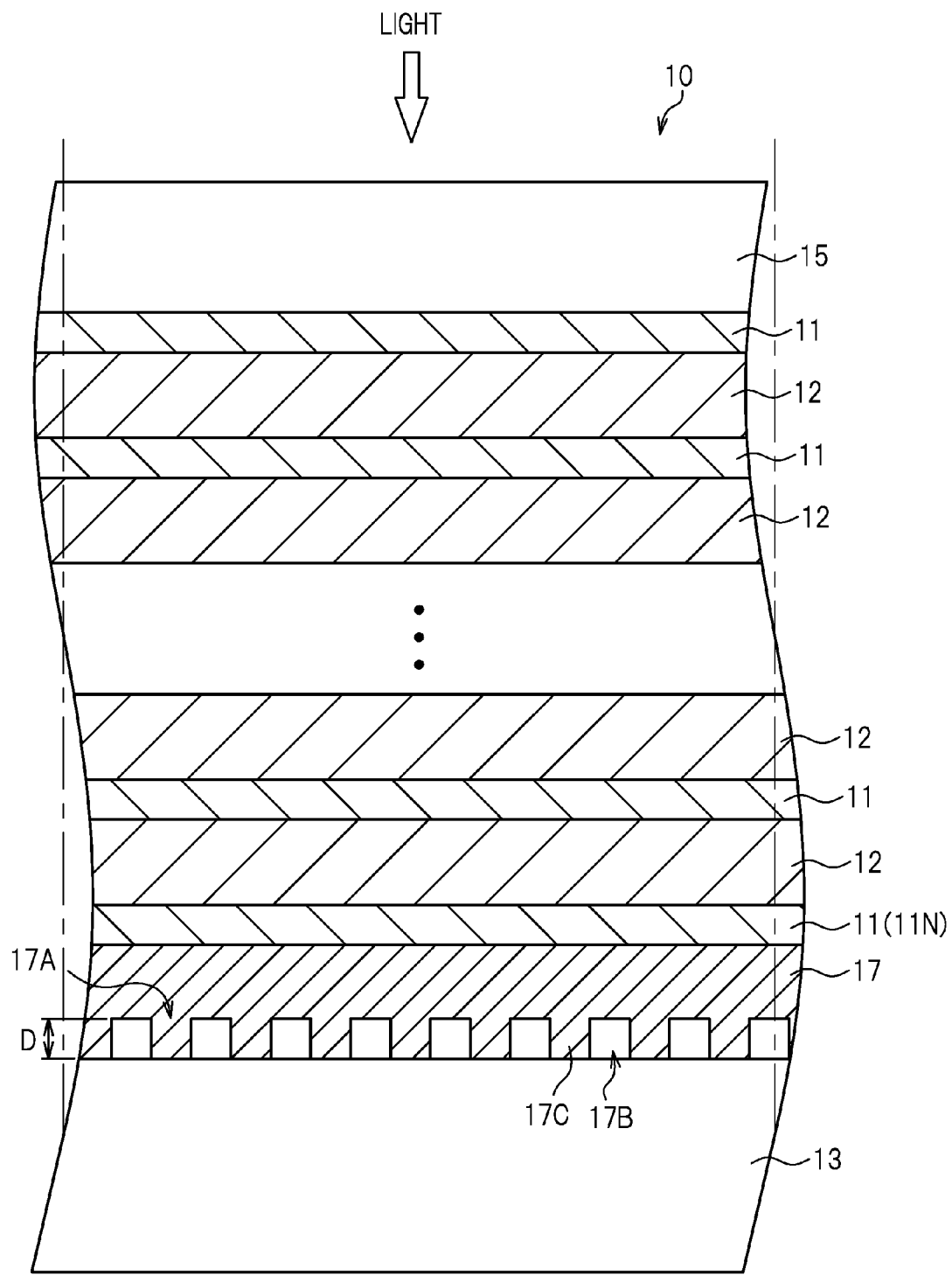
FIG. 4 is a diagram showing a structure of an optical information recording medium according to a modified embodiment.

In the above-described embodiment, the layer having a recess is exemplified by the substrate 13, but the present invention is not limited to this configuration. For example, as shown in FIG. 4, another layer having a recess (servo signal layer 17) may be provided between the recording layer 11N and the substrate 13 having no recess.

In the above-described embodiment, the surface (upper surface) of the substrate 13 (a layer having a recess) at a light-incident side on which a beam emitted for recording/reading enters is configured to have grooves or pits formed therein, and these grooves or pits are used as "recess for use in tracking", but what is usable for this purpose is not limited thereto. For example, in an alternative configuration as shown in FIG. 4 where another layer having a recess (servo signal layer 17) which is not the substrate 13 is provided, grooves 17B may be provided in a surface (lower surface) of the servo signal layer 17 at a side opposite to the light-incident side on which a beam emitted for recording/reading enters. In this configuration, insides of projections 17C protruding downward at the lower surface of the servo signal layer 17 serve as the "recess for use in tracking" (recesses 17A) as viewed from an upper side at which the beam emitted for recording/reading enters, where the refractive index n which defines the depth D (=λ/4n) of each recess 17A is the refractive index of the layer with which the recess 17A is filled, i.e., the servo signal layer 17.

In the above-described embodiment, the layer adjacent to the not-recessed (front) surface of the layer having the recess (substrate 13) and the layer with which the recess is filled are the same layer (intermediate layer 12N), but the present invention is not limited to this configuration; they may be composed of different layers. In this alternative configuration, the refractive index n which defines the depth D (=λ/4n) of the recess is the refractive index of the layer with which the recess is filled.

In the above-described embodiment, the substrate 13 made of resin is illustrated by way of example, but the present invention is not limited thereto; for example, the substrate may be formed of glass, metal, semiconductor or other material.

In the above-described embodiment, the cover layer 15 is formed on the recording layer 11, but the present invention is not limited to this configuration; for example, the cover layer 15 may be formed on the intermediate layer 12.

What is claimed is:

1. An optical information recording medium comprising:
   a plurality of recording layers;
   at least one intermediate layer provided between the plurality of recording layers; and
   a layer having a recess for use in tracking, which layer is provided in a position farther, than the plurality of recording layers, from a light-incident side on which a beam emitted for recording/reading enters,
   wherein a depth of the recess is $\lambda/4n$ where $\lambda$ is a wavelength of the beam emitted for recording/reading, n is a refractive index of a layer with which the recess is filled.

2. The optical information recording medium according to claim 1, further comprising a reflective layer provided to cover a surface having unevenness formed by the recess and configured to reflect a beam emitted for tracking.

3. The optical information recording medium according to claim 1, further comprising an absorptive layer provided between the layer having the recess and a recording layer nearest to the layer having the recess, which absorptive layer has an absorptance for the beam emitted for recording/reading greater than that for a beam emitted for tracking.

* * * * *